J. DAIN.
HAY STACKER.
APPLICATION FILED NOV. 6, 1905.

901,156.

Patented Oct. 13, 1908.
6 SHEETS—SHEET 4.

Witnesses:
J. B. Weir

Inventor
Joseph Dain,
by Bond, Adams, Pickard & Jackson
his Attys.

J. DAIN.
HAY STACKER.
APPLICATION FILED NOV. 6, 1905.

901,156.

Patented Oct. 13, 1908.

UNITED STATES PATENT OFFICE.

JOSEPH DAIN, OF OTTUMWA, IOWA, ASSIGNOR TO DAIN MANUFACTURING COMPANY OF IOWA, OF OTTUMWA, IOWA, A CORPORATION OF IOWA.

HAY-STACKER.

No. 901,156.   Specification of Letters Patent.   Patented Oct. 13, 1908.

Application filed November 6, 1905. Serial No. 286,092.

*To all whom it may concern:*

Be it known that I, JOSEPH DAIN, a citizen of the United States, residing at Ottumwa, in the county of Wapello and State of Iowa, have invented certain new and useful Improvements in Hay-Stackers, of which the following is a specification, reference being had to the accompanying drawings.

My invention relates to hay-stackers, and has for its object to provide certain new and useful improvements in such implements, as will be hereinafter particularly pointed out.

Generally speaking, said improvements relate to the devices for supporting the elevating-mechanism, by which a very strong and stable base is provided for the working parts; to the construction of the elevating-mechanism and its arrangement with relation to the base so that the fork which carries the hay may be swung through almost a complete circle; to the arrangement for applying power to the fork so that the pull is applied most advantageously during the greater part of the lifting-mechanism; to the construction of the mast, and the manner in which it is mounted; to the mechanism for controlling the position of the fork; and to various other features of construction, which will be specifically described hereinafter.

In the accompanying drawings.

The principal parts of my improved stacker are a mast, the lower end of which is stepped in a suitable bearing carried by a rectangular base, and which is supported intermediately by a turntable carried at the upper end of a frame composed of four inwardly-converging posts, which, at their lower ends, are secured to the corners of the base, above mentioned, and, at their upper ends, are secured to the turntable, giving the frame as a whole the outline of a truncated, four-sided pyramid; a forked boom, the members of which are pivotally connected near one end with the mast, their diverging outer ends being pivotally connected with a fork which carries the hay; a lower jib in the form of a beam connected at its inner end with the boom back of the pivot thereof, and at its forward end connected by diverging rods with the members of the boom near the outer ends thereof; an upper jib pivotally connected at its inner end with the rear end of the boom and extending out above the lower jib; and a swinging link pivotally connected at its inner end with the turn-table, and at its outer end with the upper jib near the outer end thereof. Suitable ropes and pulleys are provided for the boom and jibs, and there is also mechanism for holding the fork in operative position and for tripping it to discharge its load.

Figure 3:
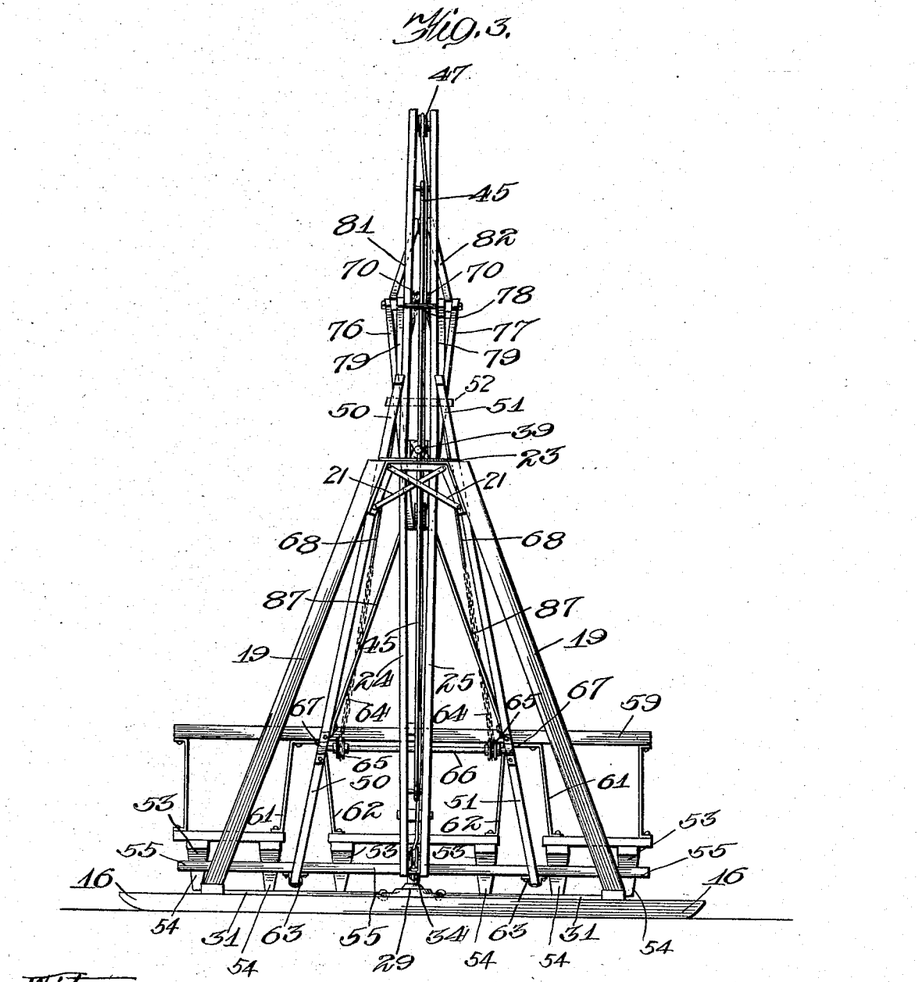
Fig. 3 is a similar view, showing the parts in rear elevation—*i. e.*, from the side opposite the points of the fork-teeth.
Figure 4:
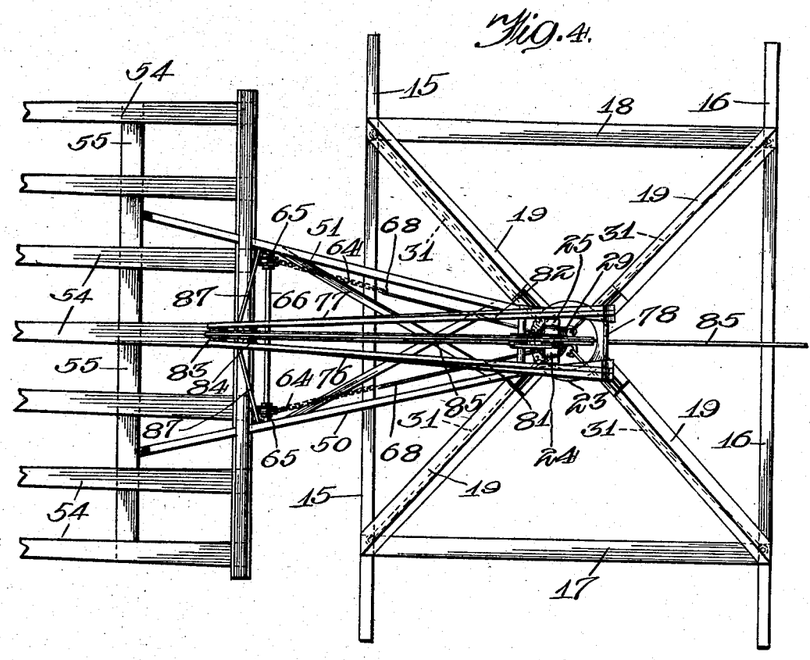
Fig. 4 is a plan view, some parts being broken away.

Referring to the drawings for a more particular description of the stacker illustrated therein,—15—16 indicate the side pieces of the base, and 17—18 the end pieces thereof. As best shown in Fig. 4, the side pieces 15—16 are somewhat longer than the end pieces 17—18, and the parts are secured together to form a substantially square frame,—the ends of the side pieces being allowed to project. Said side pieces are rounded at their ends, as shown in Fig. 3, so that they serve as runners on which the stacker may be slid from one place to another in the field.

Figure 1:
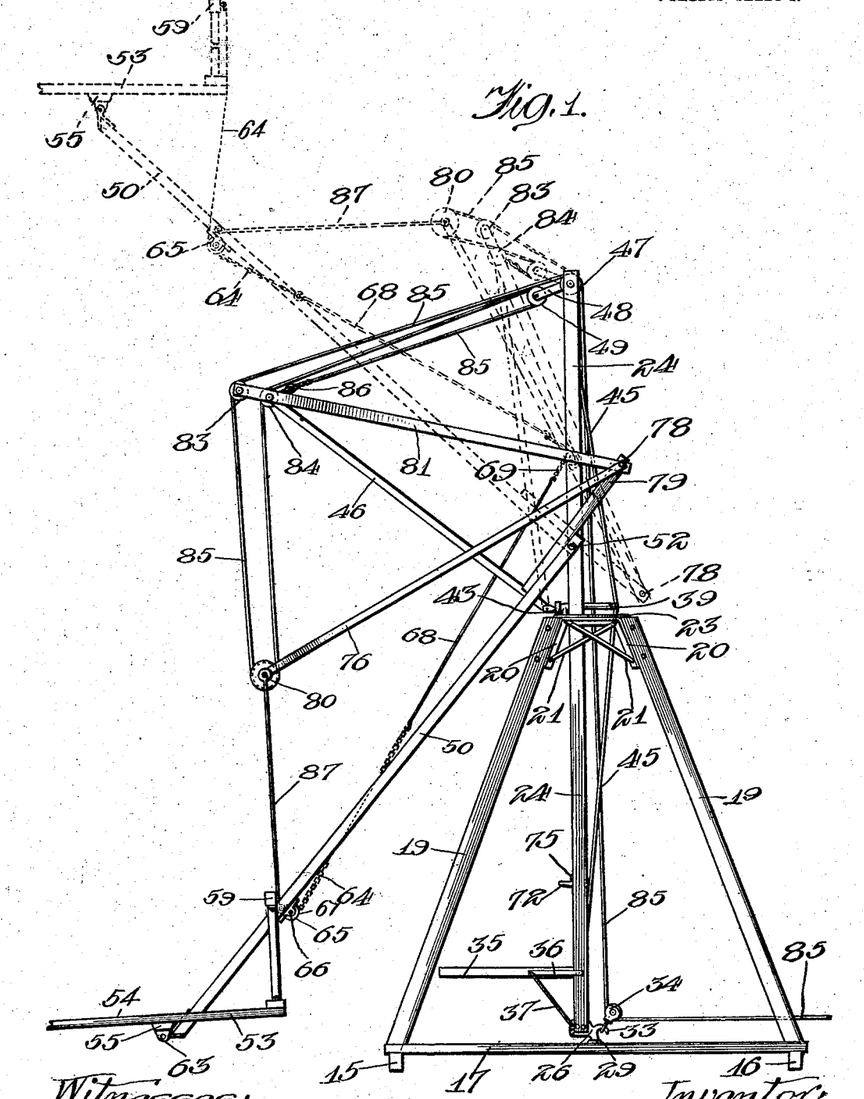
—Figure 1 is a side elevation of my improved stacker, showing in full lines the fork in its lowermost position, and also illustrating in dotted lines the fork in its uppermost position.
Figures 6, 7, 8:
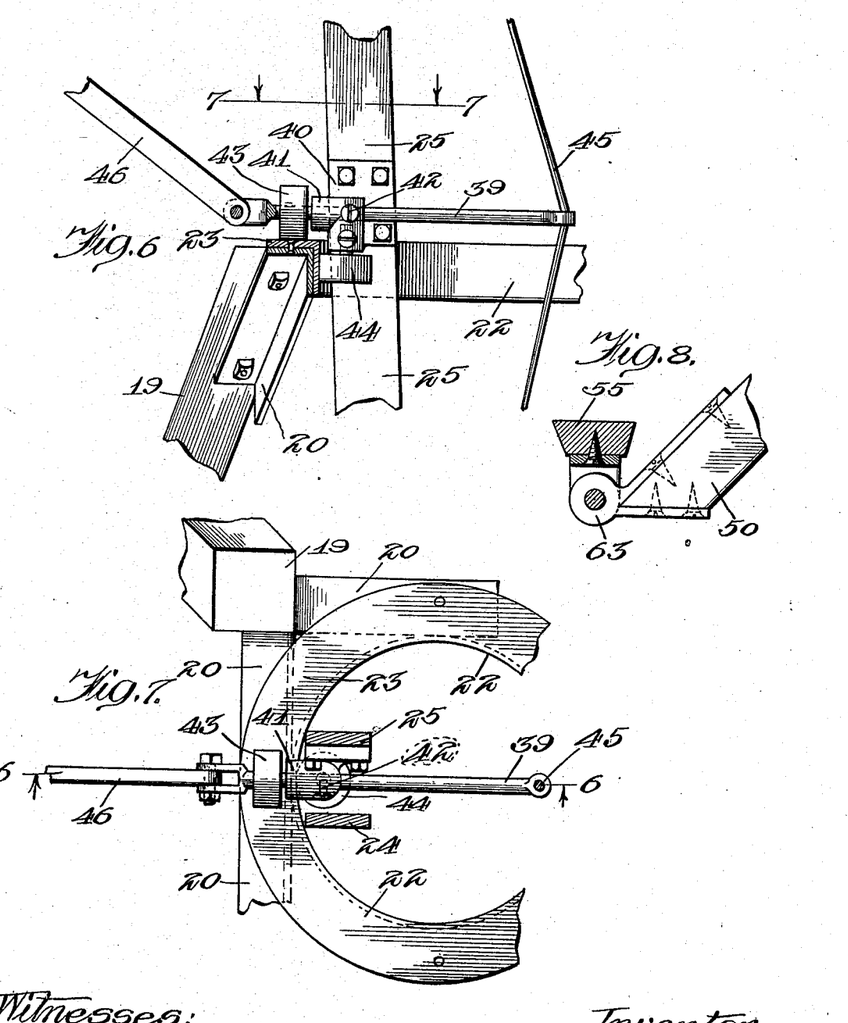
Fig. 6 is an enlarged detail, being a partial section on line 6—6 of Fig. 7.
Fig. 7 is an enlarged detail, being a partial horizontal section on line 7—7 of Fig. 6.
Fig. 8 is an enlarged detail, illustrating the manner in which the outer ends of the boom are connected with the fork.

19 indicates posts, which, at their lower ends are secured upon the base at the corners thereof, as shown in Fig. 4,—their upper ends being secured together by U-shaped braces 20, as shown in Figs. 1 and 7. Said braces are preferably made of angle-iron bent to the proper form, and, if desired, they may be reinforced by cross braces 21;

although I have found in practice that by setting the posts 19 at a proper angle any tendency to spread or buckle under the strain to which they are subjected is overcome and the cross braces need not be used.

22 indicates the lower member or track of the turntable, which is an angle-iron bent to circular form with its horizontal flange 23 outermost, so that it rests on the braces 20, as shown in Figs. 6 and 7. It may be secured to said braces in any suitable way, as by rivets. The posts 19 are, therefore, bound together at their upper ends not only by the braces 20 but also by the track 22, thus forming a very secure and stable support for the operative parts of the stacker.

By making the base substantially square, I secure equal support on all sides of the apparatus, so that however great may be the arc through which the fork is swung there is no danger of tilting or upsetting.

Figures 9, 10, 11, 12, 13:
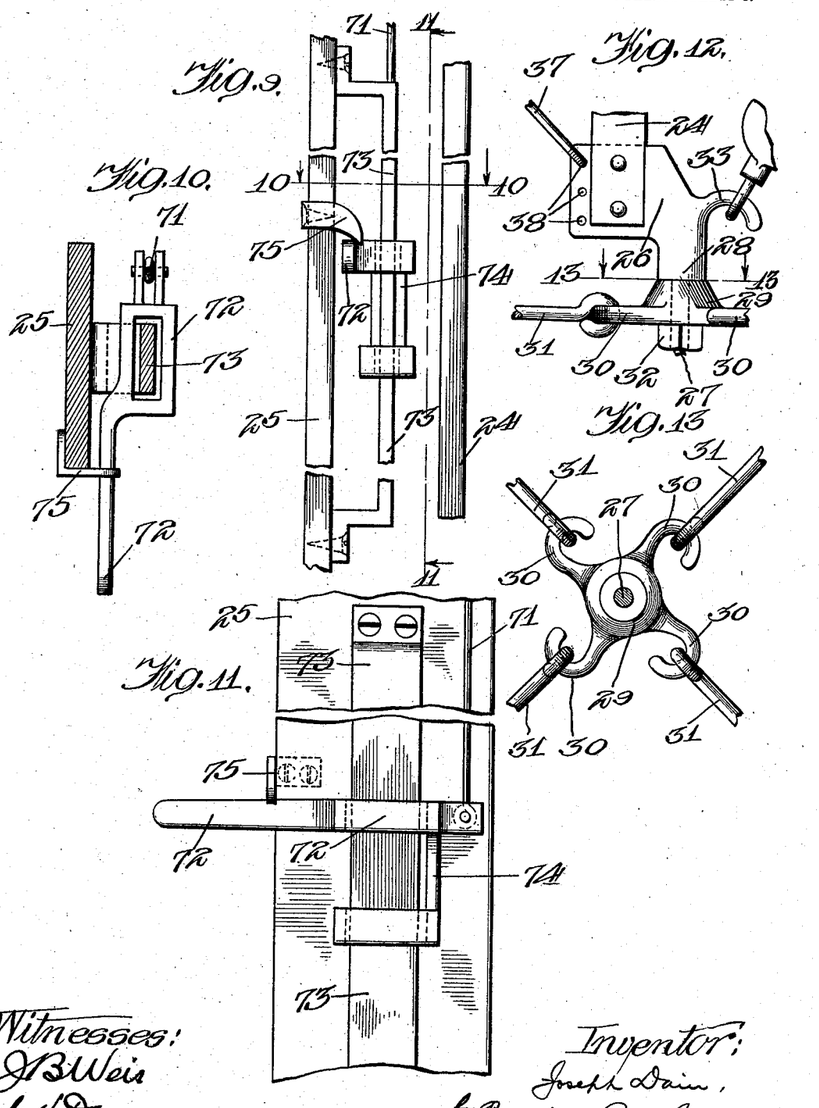
Fig. 9 is an enlarged detail of the boom, some parts being broken away.
Fig. 10 is a cross-section on line 10—10 of Fig. 9.
Fig. 11 is a partial section on line 11—11 of Fig. 9.
Fig. 12 is an enlarged detail, showing the manner in which the lower end of the mast is mounted.
Fig. 13 is a cross-section on line 13—13 of Fig. 12.

25—25 (see Fig. 3) indicate the members of the mast, which, as shown, is composed of two bars spaced apart throughout their length, but separated somewhat more towards the center than at the ends. The members of the mast are secured together in any convenient way, suitable spacing blocks being provided wherever desired. At their lower ends said members 24—25 are secured at opposite sides of a bracket 26, which carries a downwardly-extending pivot 27, as best shown in dotted lines in Fig. 12. Above said pivot is a shoulder 28. Said pivot is adapted to fit into a suitable bearing in a plate 29 carried by the rectangular base, hereinbefore described. The arrangement for securing said plate in position is best shown in Fig. 13. As therein shown, said plate is provided with a number of hooks 30, preferably four, which are connected by rods 31 with the corners of the base, as indicated by dotted lines in Fig. 4. When the mast is in position the pivot 27 fits in the bearing in the plate 29, and the shoulder 28 rests on the top of said plate, as shown in Fig. 12. A nut 32 may be screwed upon the lower end of the pivot 27 to prevent accidental displacement thereof. The plate 29 does not support the mast but merely holds its lower end in position.

33 indicates a hook carried by the bracket 26 adapted to receive a pulley 34, as will be hereinafter described.

35 indicates a sweep secured to the mast near its lower end and projecting laterally therefrom, as shown in Fig. 1.

36 indicates a lateral brace for the sweep, and 37 an inclined brace, which, at its upper end, is connected with the sweep, and at its lower end is adjustably connected with the bracket 26,—a series of holes 38 being provided in said bracket to permit of the adjustment of the point of connection of said rod 37 therewith. By this arrangement the sweep 35 may be vertically adjusted to a slight extent. As shown in Fig. 1, the length of the sweep 35 is such that it may swing around within the posts 19, which, therefore, do not prevent the mast from swinging entirely around.

39 indicates a horizontal shaft mounted between the members of the mast, above the track 22, as shown in Fig. 6. Said shaft, which forms the upper member of the turntable, is secured to the member 25 of the mast by a bracket 40 fitted in a sleeve 41 carried by said bracket, as shown in Fig. 6. A set-screw 42 serves to hold the shaft fixedly in said sleeve. 43 indicates a roller mounted on the shaft 39 and running on the upper flange 23 of the track 22. 44 indicates a roller, also carried by the sleeve 41, which is angular in form,—said roller running on the vertical inner face of the track 22. By this construction rolling supports are provided to take the downward as well as the lateral strain of the mast, thereby making the mast rotate smoothly. As shown in Fig. 6, one end of the shaft 39 projects to a considerable distance beyond the mast and supports a rod 45 which forms the chord of a truss,—the ends of said truss-rod being secured to the upper and lower end portions of the mast, as best shown in Fig. 1. The opposite end of the shaft 39 pivotally supports a link or arm 46 which is connected with the pivoted or upper jib, as hereinafter described.

Figure 2:
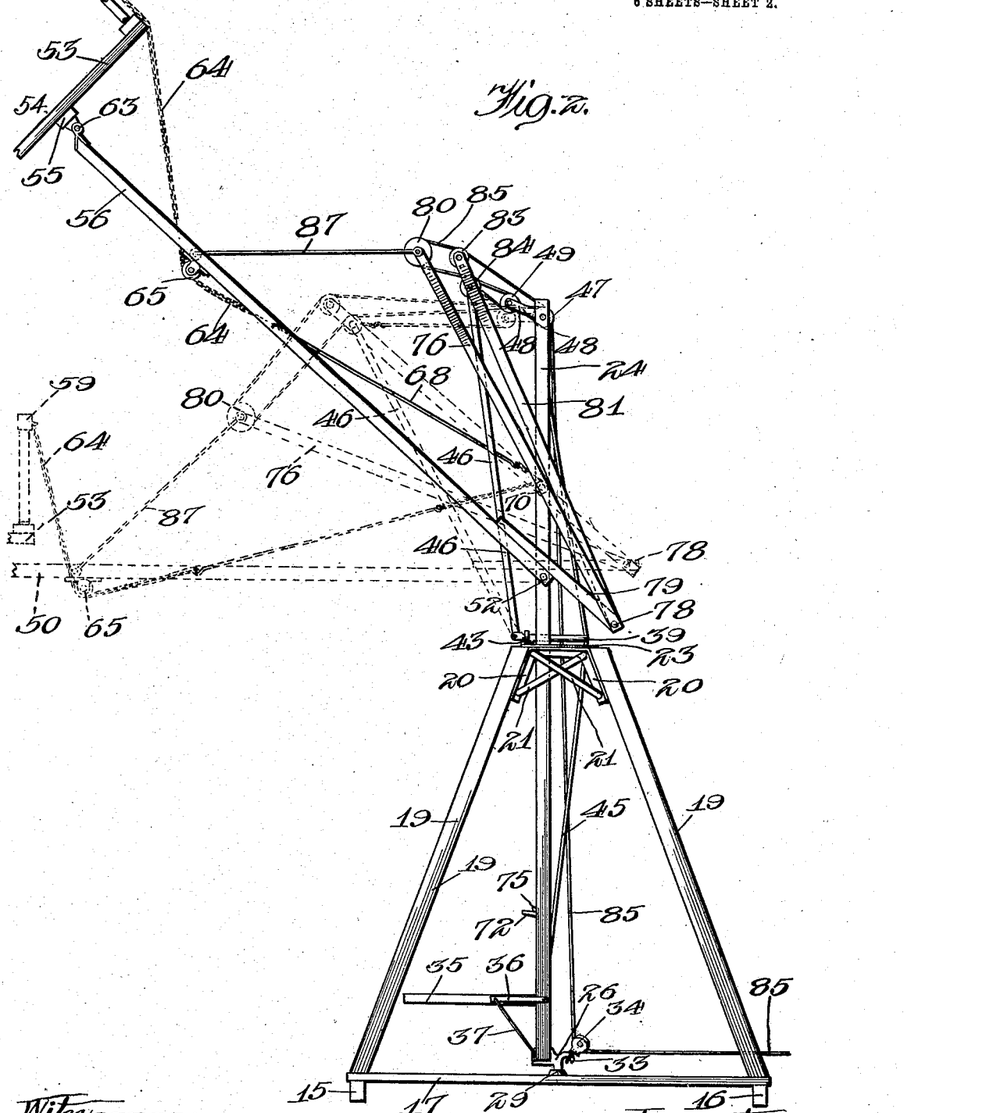
Fig. 2 is a similar view, showing in full lines the dumping of the fork, and illustrating in dotted lines the position of the parts when the fork is about half way up.

47 indicates a sheave or pulley mounted at the upper end of the mast between the members thereof, as shown in Figs. 1 and 2.

48 indicates a link pivotally connected with the upper end of the mast and projecting a short distance therefrom, as shown in Fig. 2. Said link carries a sheave 49.

Figure 5:
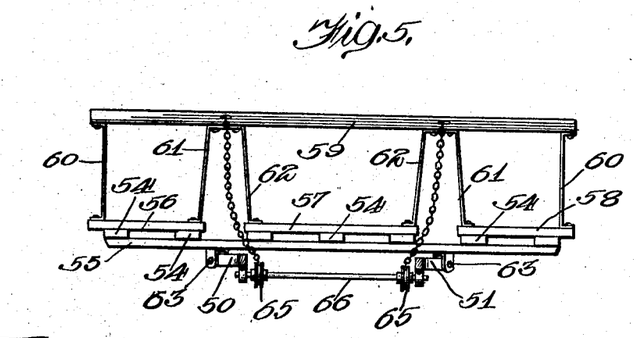
Fig. 5 is a rear view of the fork and some of the parts connected therewith.

50—51 indicate the members of the boom, which, at their rear ends, are pivoted to the members of the mast a short distance above the turn-table, as shown at 52 in Figs. 1 and 2. As best shown in Fig. 4, said members 50—51 of the boom diverge from the mast, and at their outer ends are pivotally connected with a fork 53. The construction of the fork is best shown in Figs. 3, 4 and 5. As therein shown, the fork is composed of a number of teeth 54 connected by an under cross-bar 55 and upper cross-bars 56—57—58, respectively,—the cross-bars 56—57—58 being at the rear ends of the teeth, while cross-bar 55 is a short distance from the rear ends thereof. At the rear ends of the teeth there is a transversely-arranged frame or head composed of a cross-bar 59 and uprights 60—61—62, as shown in Fig. 5. The purpose of this head is to keep the hay from sliding off the rear ends of the teeth. As shown in Fig. 3, the forward ends of the members 50—51 of the boom pass between the uprights 61—62 and extend down between the teeth to the lower cross-bar, to which they are connected by hinges 63, as shown in Fig. 8.

The fork is held normally with its teeth in a substantially horizontal position by means of chains 64, the forward ends of which are connected with the cross-bar 59 at the outer portions thereof, as indicated in Fig. 5. Said chains pass under pulleys 65 carried by a shaft 66, which is mounted in suitable bearings 67 carried by the members 50—51 of the boom, as shown in Figs. 1, 3 and 4. Said chains, after passing under said pulleys, are connected by rods 68 with chains 69, which pass over a pulley 70 journaled between the members of the mast at a point above the pivot 52, as shown in Fig. 2. Said chains thence pass downward between the members of the mast and are connected to a vertically-movable rod 71, which, at its lower end, is connected to a lever 72 mounted between the members of the mast, as shown in Fig. 11. Said lever is pivotally mounted in the sense that it is carried by the mast and rotates with it, and it is arranged to slide vertically upon a vertical guide-bar 73 secured between the members of the mast, being provided with a frame 74 which embraces said bar, as shown in Fig. 9.

75 indicates a hook or stop under which the lever 72 may be caught to hold it in its lowermost position.

When the lever 72 is released, the rod 71 may move upward slackening the chains 64 and permitting the fork to tilt on its pivots, so that the points of the teeth may drop, as illustrated in Fig. 2. When the lever 72 is caught under the stop 75, the teeth of the fork are held in substantially a horizontal position regardless of the position of the boom, as will be hereinafter described. By moving the lever 72 down below the stop 75 the points of the teeth of the fork may be thrown upward.

The rods 68 are employed instead of making the chains 64 continuous simply as a matter of convenience, as, if desired, continuous chains, or other flexible connections, may be used in place of the arrangement described.

76—77 indicate the members of the lower jib, which is V-shaped, as shown in Fig. 4, its apex being outermost. The separated ends of the members 76—77 are connected with the boom 50 by a shaft 78, as shown in Fig. 1. As therein shown, the jib is not connected directly to the boom 50 but rather to extensions 79 thereof which project beyond the pivots 52. If desired, the extensions 79 may be made integral with the boom. By connecting the jib to the boom back of the pivotal point thereof a counteracting leverage is obtained from the extended ends of the boom which is particularly effective when the fork is unevenly loaded. In operation if one side of the fork is more heavily loaded the member of the boom on the opposite side will have a tendency to rise first, and the opposite end of said member, or that portion which projects past the pivotal point of the boom, would impart a reverse motion to the jib which tends to equalize the effect of the greater weight at one end of the fork.

87 indicates diverging connecting rods, which connect the opposite ends of the members 76—77 of the lower jib with the boom 50, said rods being connected with said boom near the outer end thereof, as shown in Figs. 1, 2 and 4. The lower jib is thus held against angular adjustment relatively to the boom. Said diverging connecting rods also serve to properly support the end portions of the fork so as to compensate for any unequal distribution of the load.

80 indicates a sheave carried at the outer end of the lower jib, being fitted between the members 76—77, as shown in Fig. 1.

81—82 indicate the members of the upper jib, which is also V-shaped, and extends out over the lower jib, as shown in Fig. 1. The members of the upper jib are pivotally mounted on the shaft 78, as shown in said figure, so that its outer end may be swung toward and from the boom.

83—84 indicate sheaves carried by the upper jib near the outer end thereof, as shown in Figs. 1 and 4.

As shown in Figs. 1 and 2, the pivot or axis which supports the link or arm 46 at its lower end is eccentrically disposed with reference to the axis of the boom 50, and said arm 46 is connected at its outer end with the outer portion of the upper jib. The link or arm 46 thus not only serves as a brace for the upper jib as the boom is raised or lowered, but also governs the relative speed of the two jibs, as hereinafter set forth.

85 indicates the hoisting-rope, which is connected at one end with the upper jib near the outer end of the link 46, as shown at 86 in Fig. 1. From this point of connection with the upper jib the rope passes over sheave 49, thence down over sheave 84, around sheave 80, and up over sheave 83 to sheave 47, passing down over said sheave and around sheave 34 at the bottom of the mast, and then out, where suitable draft devices are provided so that a team may readily be hitched to it.

In operation the fork is lowered to the position shown in Fig. 1, where it receives its load of hay. The team then hauls on the rope 85, thereby pulling up on the outer end of the lower jib 76,—the upper jib acting as a strut or guide to direct the rope out from the mast so that the pulling is almost directly vertical during the greater part of the lifting operation. Moreover, the mounting of the upper jib on that portion of the boom which extends to the rear of its pivot facilitates the lifting operation and tends to balance the boom, and by the use of the arm or link 46 the relative speed of the two jibs is controlled,—the lower jib, in the construction shown, traveling approximately twice as fast as the upper jib. The boom is raised as high as may be necessary to cause the fork to clear any obstructions, after which the mast may be rotated to any desired extent, as it is capable of swinging through practically an entire circle. As illustrated in dotted lines in Figs. 1 and 2, the fork remains in its carrying position with its teeth substantially horizontal throughout the entire lifting operation,—this being accomplished by the action of the chains 64 and their connections, as hereinbefore described. During the lifting operation the lever 72 is in engagement with the stop 75. When the fork is raised to the desired height, and is turned to such position as to overlie the dumping place, the hay is discharged by releasing the lever 72 from the stop 75. The weight of the hay accordingly tips the points of the fork teeth down, as shown in full lines in Fig. 2, permitting the hay to slide off. If desired, the fork may be tilted in the opposite direction by depressing the lever 72 below the point shown in Fig. 11.

I have described with great particularity the embodiment of my invention illustrated in the accompanying drawings, but I wish it to be understood that in so doing I did not intend to restrict myself to the special construction shown, as my invention is not restricted to such construction, except in so far as it is particularly claimed,—the broader claims being intended to cover my invention generically.

That which I claim as my invention and desire to secure by Letters Patent is,—

1. In a hay-stacker, the combination of a base, a rotary mast, a boom pivotally mounted on the mast, a fork mounted on the boom, a jib connected at one end portion with the inner end of the boom, and connecting rods connecting the opposite end portion of said jib with the outer portion of the boom.

2. In a hay-stacker, the combination of a base, a mast rotatably mounted upon said base, a boom pivotally mounted on the mast and extending beyond its pivotal connection, a fork mounted on the boom, a jib connected with the extended end of the boom, and connecting rods connecting said jib with the outer portion of the boom.

3. In a hay-stacker, the combination of a base, a rotary mast, a boom pivotally mounted on the mast and extending outwardly therefrom, a fork carried by the boom, a plurality of jibs rotatable with the mast, one of said jibs being pivotally connected with the boom, and hoisting means connected with said jibs.

4. In a hay-stacker, the combination of a base, a rotary mast, a boom pivotally mounted on the mast and extending outwardly therefrom, a fork carried by the boom, a plurality of jibs rotatable with the mast, and means connecting the outer portion of one of said jibs with the boom.

5. In a hay-stacker, the combination of a base, a rotary mast, a boom pivotally mounted on the mast and extending outwardly therefrom, a plurality of jibs mounted to rotate with said mast, and hoisting mechanism connected with said jibs and with the mast.

6. In a hay-stacker, the combination of a base, a rotary mast, a boom pivotally mounted on the mast and extending outwardly therefrom, a plurality of jibs mounted to rotate with said mast, hoisting mechanism connected with said jibs and with the mast, and a connection between the outer end portion of one of said jibs and the outer portion of the boom.

7. In a hay-stacker, the combination of a base, a rotary mast, a boom pivotally mounted on the mast and extending outwardly therefrom, a plurality of jibs mounted to rotate with said mast, and hoisting mechanism connected with said jibs and with the mast, one of said jibs being pivotally connected with the inner end portion of the boom.

8. In a hay-stacker, the combination of a base, a rotary mast, a boom pivotally mounted on the mast and extending beyond its pivotal connection, a plurality of jibs connected with the extended end of the boom, means connecting the outer end of one of said jibs with the outer portion of the boom, a swinging brace for the other jib, and hoisting means connected with said jibs and with the mast.

9. In a hay-stacker, the combination of a base, a rotary mast, a boom pivotally mounted on the mast and extending beyond its pivotal connection, a plurality of jibs connected with the extended end of the boom, means connecting the outer end of one of said jibs with the outer portion of the boom, a swinging link pivotally connected with the outer portion of the other jib, and hoisting mechanism connected with said jibs and with the mast.

10. In a hay-stacker, the combination of a base, a turn-table carried thereby, a mast within said turn-table and rotatably supported thereby, a boom pivotally connected with the mast, hoisting mechanism supported by the mast and connected with said boom, and a fork carried by the boom.

11. In a hay-stacker, the combination of a base, a turn-table carried thereby, a mast within said turn-table and rotatably supported thereby, a boom pivotally connected with the mast, hoisting mechanism supported by the mast and connected with said boom, a fork carried by the boom, and means connected with the mast for controlling the position of the fork.

12. In a hay-stacker, the combination of a base, a turn-table carried thereby, a mast within said turn-table and rotatably supported thereby, a boom pivotally connected with the mast, hoisting mechanism supported by the mast and connected with said boom, and a fork carried by the boom, said mast having a lateral bearing on said turn-table.

13. In a hay-stacker, the combination of a base, a turn-table supported thereby, said turn-table having horizontal and vertical bearing surfaces, rollers running on said bearing surfaces, a mast within said turn-table, a boom pivotally connected with the mast, a fork carried by the boom, and hoisting mechanism carried by the mast and connected with the boom.

14. In a hay-stacker, the combination of a base, horizontal and vertical circular tracks supported thereby, a mast within said tracks, a shaft secured to the mast, rollers connected with said shaft and running on said tracks, a truss-rod connected with the end portions of the mast and bearing against one end of said shaft, a boom pivotally connected with said mast, and hoisting mechanism carried by said mast and connected with said boom.

15. In a hay-stacker, the combination of a base, horizontal and vertical circular tracks supported thereby, a mast within said tracks, a shaft secured to the mast, rollers connected with said shaft and running on said tracks, a truss-rod connected with the end portions of the mast and bearing against one end of said shaft, a boom pivotally connected with said mast, a jib pivotally mounted on said boom, an arm connected with said shaft and with said jib, means connecting said jib with the boom, and hoisting means connected with said jib and with the mast.

16. In a hay-stacker, the combination of a base, a turn-table carried by said base, a mast within said turn-table and supported thereby, means connected with the base for holding the lower end of the mast in position, a boom pivotally connected with the mast, hoisting mechanism connected with the mast and with the outer portion of the boom, and a fork carried by the boom.

17. In a hay-stacker, the combination of a base, a rotatable mast, a boom pivotally connected with the mast, a fork carried by the boom, a jib connected at its ends with said boom and sustaining an angular relation therewith, a jib pivotally connected with said boom and angularly adjustable relatively thereto, and hoisting means connected with said jibs.

18. In a hay-stacker, the combination of a base, posts carried thereby and converging toward their upper ends, a track carried by said posts, a mast extending within said track and supported thereupon, a boom pivotally connected with the mast, a fork carried by the boom, and hoisting mechanism for hoisting the boom.

19. In a hay-stacker, the combination of a base, posts resting thereon and converging toward their upper ends, a track carried by said posts, a mast extending within said track and supported thereupon, a bearing for the lower end of the mast, a boom pivotally connected with the mast, a fork carried by the boom, and hoisting mechanism.

20. In a hay-stacker, the combination of a quadrilateral base, posts secured at the corners thereof and converging toward their upper ends, a circular track carried at the upper ends of said posts, a mast extending within said track and supported thereupon, the lower portion of said mast being stepped in said base, a boom pivotally connected with the mast, hoisting mechanism connected with the mast and with the boom, and a fork carried by the boom.

21. In a hay-stacker, the combination of a base, a mast composed of two members spaced apart, means connecting said members, a turn-table supporting the members of said mast intermediately, means for holding the lower end of the mast in position, a boom pivotally connected with the mast, a fork carried by said boom, and hoisting mechanism carried by the mast and connected with said boom.

22. In a hay-stacker, the combination of a mast, a boom pivotally supported by the mast, a jib mounted at one end portion on the inner end portion of the boom, and diverging connecting devices connecting said jib with the outer portion of the boom.

23. In a hay-stacker, the combination of a mast, a boom pivotally supported by the mast, hoisting mechanism, and diverging connecting devices connecting said hoisting mechanism with the outer portion of the boom.

24. In a hay-stacker, the combination of a mast, a V-shaped boom pivotally supported thereby, a V-shaped jib connected at one end portion with the inner end of the boom, and diverging means connecting said jib with the outer portion of the boom.

25. In a hay-stacker, the combination of a mast, a boom pivotally supported by the mast and extending beyond its pivotal connection, a V-shaped jib connected with the extended end portion of the boom, and diverging means connecting said jib with the outer portion of the boom.

26. In a hay-stacker, the combination of a mast, a boom pivotally supported thereby, a jib pivotally connected with the inner portion of the boom, and hoisting mechanism connected with the mast and with the outer end portions of said jib and boom, said hoisting mechanism being arranged to move said boom at a higher rate of speed than said jib.

27. In a hay-stacker, the combination of a mast, a boom pivotally supported thereby, a plurality of jibs, one of said jibs being pivotally connected with the inner end portion of said boom, means connecting the outer end portion of the other jib with the outer portion of the boom, and hoisting mechanism connected with the mast and with said jibs, said hoisting mechanism being arranged to move the latter jib at a higher rate of speed than the former.

28. In a hay-stacker, the combination of a rotary mast, a boom pivotally supported between its ends by said mast, a jib connected at its inner end with the inner end portion of the boom, hoisting mechanism carried by said jib for hoisting the outer portion of the boom, and an arm for controlling the speed of said jib when the hoisting mechanism is operated to raise and lower the boom.

29. In a hay-stacker, the combination of a rotary mast, a boom pivotally supported between its ends by said mast, a jib pivotally connected with said mast at one side of the pivot thereof, an arm connected at its inner end portion to rotate with the mast and at its outer end portion connected with the outer portion of said jib, and hoisting mechanism running over said jib for hoisting the outer end portion of the boom.

30. In a hay-stacker, the combination of a rotary mast, a boom pivotally connected near one end with the mast, a jib pivotally connected with the inner end portion of the boom, an arm connected at its inner end to rotate with the mast and at its outer end connected with the outer end portion of the jib, a second jib pivotally connected with the inner end portion of the boom, means connecting the outer portion of said second jib with the outer portion of the boom, and hoisting mechanism connected with said jibs and with the mast.

31. In a hay stacker, the combination of a boom pivotally mounted to swing vertically, an arm extending over said boom and pivotally mounted to swing vertically about an axis eccentric to the axis of the boom, and means for causing said arm and boom to move simultaneously in the same direction, but at different rates of speed.

32. In a hay stacker, the combination of a boom pivotally mounted to swing vertically, an arm extending over said boom and pivotally mounted to swing vertically about an axis eccentric to the axis of the boom, and means operated by movement of one of said swinging members for moving the other member in the same direction but at a different rate of speed.

33. In a hay stacker, the combination of a boom pivotally mounted to swing vertically, an arm extending over said boom and pivotally mounted to swing vertically about an axis eccentric to the axis of the boom, and means connecting the inner portion of the boom and the outer portion of said arm.

34. In a hay-stacker, the combination of a support, a boom pivotally connected therewith, an arm pivotally supported at a point removed from the pivot of the boom, means connecting said arm with said boom and acting to cause the boom to move at a higher rate of speed than said arm, and hoisting means.

35. In a hay-stacker, the combination of a support, a boom pivotally connected therewith, an arm pivotally supported at a point removed from the pivot of the boom, means connecting said arm with the boom and acting to move the boom at a higher rate of speed than said arm, and hoisting means supported by said arm and connected with said boom.

36. In a hay-stacker, the combination of a support pivoted to turn on a vertical axis, a boom pivotally connected with said support, an arm pivotally mounted at a point removed from the pivot of the boom and adapted to rotate with said support, means connecting said arm with said boom and arranged to cause said boom to move at a higher rate of speed than said arm and hoisting means.

37. In a hay-stacker, the combination of a mast, a boom pivotally supported by said mast, an arm pivotally supported independently of the boom at a point removed from the pivot of the boom and adapted to rotate with the mast, means connecting said arm with the boom, and hoisting means connected with said arm and with the boom.

JOSEPH DAIN.

Witnesses:
W. G. DUFFIELD,
C. A. LASSER.